United States Patent [19]
Meyer et al.

[11] Patent Number: 5,503,944
[45] Date of Patent: Apr. 2, 1996

[54] WATER MANAGEMENT SYSTEM FOR SOLID POLYMER ELECTROLYTE FUEL CELL POWER PLANTS

[75] Inventors: Alfred P. Meyer, West Simsbury; Glenn W. Scheffler, Tolland; Paul R. Margiott, South Windsor, all of Conn.

[73] Assignee: International Fuel Cells Corp., South Windsor, Conn.

[21] Appl. No.: 497,674

[22] Filed: Jun. 30, 1995

[51] Int. Cl.$^6$ .................................................. H01M 8/04
[52] U.S. Cl. ............................ 429/13; 429/26; 429/30; 429/25
[58] Field of Search .................................. 429/13, 14, 26, 429/34, 17, 22, 25, 30

[56] References Cited

U.S. PATENT DOCUMENTS 5,322,744  6/1994  Koseki ........................ 429/13
5,360,679  11/1994  Buswell ....................... 429/19

FOREIGN PATENT DOCUMENTS 389020B  10/1989  Austria .
WO9415377  7/1994  WIPO .

Primary Examiner—Anthony Skapars
Attorney, Agent, or Firm—William W. Jones

[57] ABSTRACT

A simplified solid polymer electrolyte fuel cell power plant utilizes porous conductive separator plates having central passages which are filled with circulating coolant water. The coolant water passes through a heat exchanger which rejects heat generated in the power plant. Water appearing on the cathode side of each cell membrane is pumped into the water circulation passages through the porous oxidant reactant flow field plates by a positive ΔP created between the cathode reactant flow field of each cell and the coolant water circulation passages between each cell. In order to create the desired ΔP, at least one of the reactant gas streams will be referenced to the coolant water loop so as to create a coolant loop pressure which is less than the referenced reactant gas stream pressure. Excess water is removed from the coolant water stream. The system can operate at ambient or at elevated pressures. Each cell in the power plant is individually cooled on demand, and the power plant does not require a separate cooling section or reactant stream humidifying devices.

24 Claims, 3 Drawing Sheets

WATER MANAGEMENT SYSTEM FOR SOLID POLYMER ELECTROLYTE FUEL CELL POWER PLANTS

TECHNICAL FIELD

This invention relates to a simplified solid polymer electrolyte fuel cell power plant which can operate at ambient or above-ambient pressure, and which is admirably suited for use in both portable and/or stationary power plants. More particularly, this invention relates to a stationary or mobile solid polymer electrolyte power plant which utilizes a positive pressure differential between a reactant flow field and the water flow field in order to manage water migration within the fuel cell units in the power plant.

BACKGROUND ART

Solid polymer electrolyte fuel cell power plants are known in the prior art, and prototypes are even available from commercial sources, such as Ballard Power Systems, Inc. of Vancouver, Canada. These systems are serviceable, but are relatively complex. An example of a Ballard Power Systems polymer membrane power plant is shown in U.S. Pat. No. 5,360,679, granted Nov. 1, 1994. One problem occurring in solid polymer fuel cells relates to the management of water, both coolant and product water, within: the cells in the power plant. In a solid polymer membrane fuel cell power plant, product water is formed by the electrochemical reaction at the membrane on the cathode side of the cells by the combination there of hydrogen and oxygen ions. The product water must be drawn away from the cathode side of the cells, and makeup water must be provided to the anode side of the cells in amounts which will prevent dryout, while avoiding flooding, of the anode side of the electrolyte membrane.

Austrian Patent No. 389,020 describes a hydrogen ion-exchange membrane fuel cell stack which utilizes a fine pore water coolant plate assemblage to provide a passive coolant and water management control. The Austrian system utilizes a water-saturated fine pore plate assemblage between the cathode side of one cell and the anode side of the adjacent cell to both cool the cells and to prevent reactant cross-over between adjacent cells. The fine pore plate assemblage is also used to move product water away from the cathode side of the ion-exchange membrane and into the coolant water stream; and to move coolant water toward the anode side of the ion-exchange membrane to prevent anode dryout. The preferred directional movement of the product and coolant water is accomplished by forming the water coolant plate assemblage in two parts, one part having a pore size which will ensure that product water formed on the cathode side will be wicked into the fine pore plate and moved by capillarity toward the water coolant passage network which is inside of the coolant plate assemblage. The coolant plate assemblage also includes a second plate which has a finer pore structure than the first plate, and which is operable to wick water out of the water coolant passages and move that water toward the anode by capillarity. The fine pore and finer pore plates in each assemblage are grooved to form the coolant passage network, and are disposed in face-to-face alignment between adjacent cells. The finer pore plate is thinner than the fine pore plate so as to position the water coolant passages in closer proximity with the anodes than with the cathodes. The aforesaid solution to water management and cell cooling in ion-exchange membrane fuel cell power plants is difficult to achieve due to the quality control requirements of the fine and finer pore plates, and is also expensive because the plate components are not uniformly produced.

It would be desirable to provide a simplified solid polymer fuel cell power plant which may be used as a power supply for various pressurized and ambient pressure applications, such as automotive, public transportation, or the like; and also in stationary power plants.

DISCLOSURE OF THE INVENTION

This invention relates generally to passive water management and cell cooling in an ion-exchange membrane fuel cell power plant. The passive water control and coolant system of this invention can be used in pressurized membrane fuel cell power plants, where both of the reactant gases are pressurized to pressures on the order of about 30 to about 50 psig for example, and can also be used where the reactants operate at essentially ambient pressures. The system of this invention utilizes fine pore plate components and pressure differences ($\Delta P$) between the water coolant loop and the reactant gases to ensure that product water formed on the cathode side of the cells in the power plant and water displaced by proton drag from the anode side of the membrane to the cathode side will migrate from the cathode flow field to the coolant loop, and that water from the coolant loop will move toward the anode side of the membrane so as to prevent dryout of the anode surface of the membrane, but not flood the anode flow field. In one embodiment of the invention, the fine pore plates used in the system are flooded with water so as to provide a gas-impermeable barrier between the cathode reactant flow field in one cell and the anode reactant flow field in the next cell so that reactant gas cross-over from one cell to the next is prevented. Alternatively, the system of this invention may employ a solid impermeable separator plate between adjacent cells in the power plant to prevent reactant cross-over. In order to provide the desired water migration in the system, the cathode reactant gas pressure will be maintained in the range of about 0.5 to about 10 psig higher than the prevailing pressure in the water coolant loop and in the fine pore plate. When this pressure differential is maintained, the fine pore plate will be able to move water away from the cathode surface of the membrane, while at the same time, the bubble pressure of the water in the fine pore plate will prevent the reactant gases from penetrating the pores of the saturated plate. The phrase "bubble pressure" refers to the positive water pressure in the fine pore plate which is inversely proportional to the pore size in the plate. Thus, the smaller the pore diameter in the plate, the greater pressure exerted by the water entrained in the plate. The "bubble pressure" is the pressure above which reactant gas bubbles will be forced through the water-saturated porous plate so as to create the undesirable possibility of fuel and oxidant gas commingling, and will also prevent reactants from entering the coolant loop. It will be appreciated that lower pore diameters will increase the bubble pressure threshold, while at the same time hindering to some extent product water migration through the fine pore plates. Therefore, appropriate plate pore sizes should be maintained in order to achieve optimal operation of the system. Pore diameters in the "fine pore" plates referenced in this specification are typically in the range of 1–2 micron median pore diameter.

A preferable manner in which the appropriate system $\Delta P$ between reactant gas pressure and water coolant pressure is maintained is to reference the water coolant pressure to the reactant gas pressure, In a pressurized system, the pressurized reactant gases can be used to impose a predetermined pressure on the water coolant, which predetermined pressure is then partially lowered, thereby creating a ΔP between the reactant and coolant water loop pressures. In an air oxidant ambient pressure system, the coolant loop can be exposed to ambient pressures, and the air oxidant pressure can be increased above ambient pressure with a blower or compressor. In either case, a positive oxidant reactant gas-to-water coolant ΔP will be created in the system in order to promote water migration from the cathode side of the membrane into the water coolant circulation loop.

The fuel reactant can be provided from a pressurized container, and its anode flow pressure can be dropped to an appropriate level with valves or pressure regulators so as to allow migration of coolant water from the coolant loop toward the anode side of the membrane, while preventing flooding of the anode side of the membrane.

Each cell has its own dedicated water source, so that coolant and membrane moisturizing water is provided to each cell, on demand, thereby adjusting water flow management to conform to ongoing cell operating conditions. The water supply is circulated through the power plant by a pump, which may be a fixed or variable speed pump. The water circulating system also picks up water from the cathode side of each cell and entrains the water in the circulating cooling water stream. Periodically excess water can be removed from the coolant loop. The circulating cooling water stream passes through a heat exchanger which rejects system-generated heat, and lowers the temperature of the water stream so as to enable the water stream to be reused to cool and humidify the individual cells.

In a portable or mobile ambient pressure embodiment of the invention, the cooled water stream can flow past a branch conduit that leads to a stand pipe, into which excess water that is entrained in the water stream can migrate. The stand pipe is open to ambient surroundings, and periodically allows spillage of excess water from the system into ambient surroundings. The stand pipe also provides a predetermined back pressure imposed on the coolant water circulating system, which ensures the necessary ΔP between the coolant water system and the oxidant reactant flow field.

It is therefore an object of this invention to provide a passive, self-adjusting water and coolant management system for use in an ion-exchange membrane fuel cell power plant.

It is a further object of this invention to provide a system of the character described wherein water movement is controlled in both atmospheric and pressurized systems.

It is an additional object of this invention to provide a fuel cell power plant of the character described wherein each cell in the power plant is properly cooled and humidified as required by ongoing cell operating conditions.

It is yet a further object of this invention to provide a fuel cell power plant of the character described wherein product water generated by the electrochemical reaction in the system is released from the system.

These and other objects and advantages of the invention will become more readily apparent from the following detailed description of an embodiment of the invention when taken in conjunction with the accompanying drawings in which:

BEST MODE FOR CARRYING OUT THE INVENTION

Figure 1:
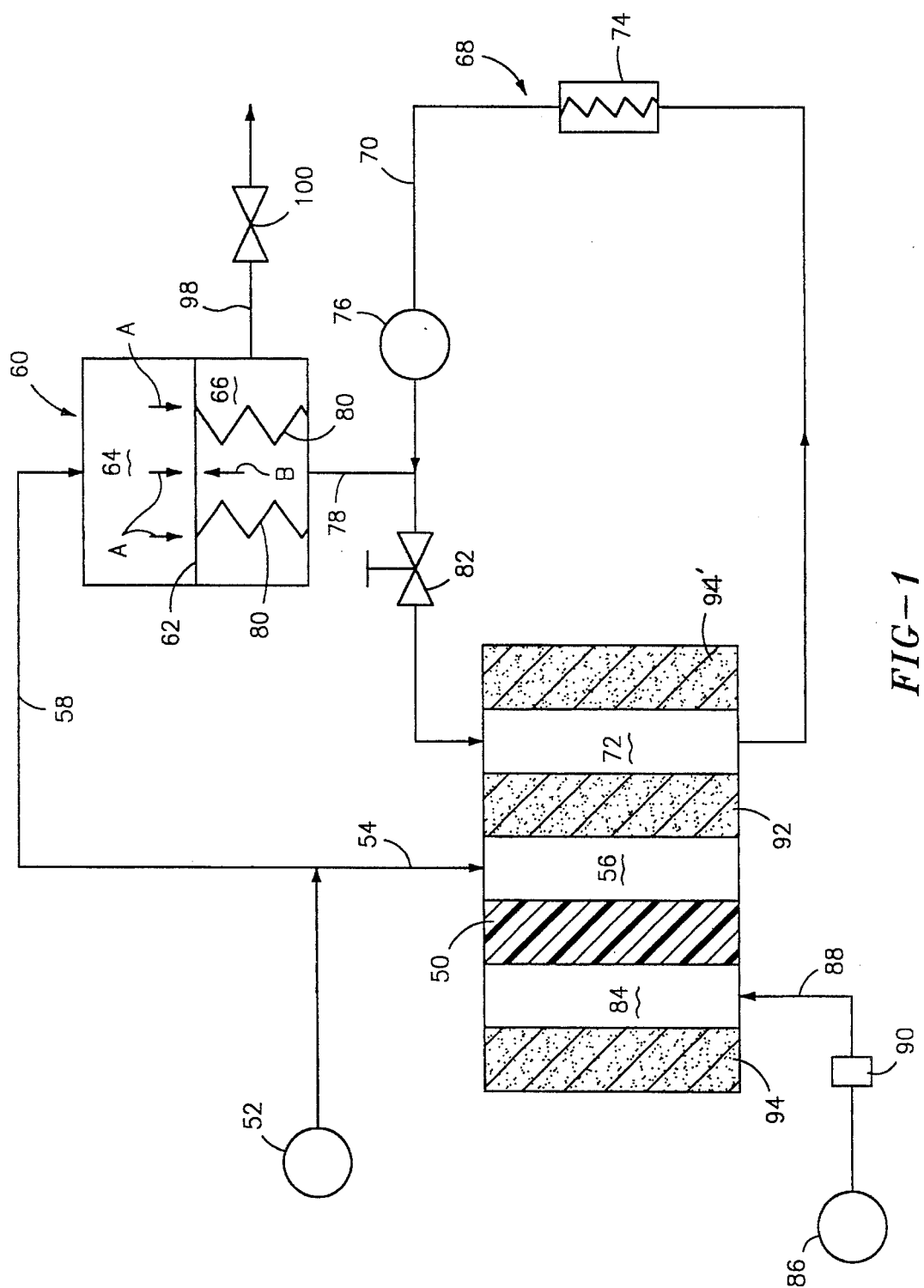
FIG. 1 is a schematic view of a fuel cell system employing an ion-exchange membrane, which system forms a part of a fuel cell power plant formed in accordance with this invention.

Referring now to FIG. 1, there is shown a membrane fuel cell system in a fuel cell power plant, which system is shown schematically, and wherein the ion-exchange membrane electrolyte/electrode assembly (MEA) is designated by the numeral 50. The MEA conventionally will include a membrane, and electrode catalyst layers and electrode substrate layers on each side of the membrane; however, in certain cases the substrate layers may be omitted from the MEA. It will be understood that the system shown in FIG. 1 comprises one cell system unit which is repeated a predetermined number of times in the fuel cell power plant stack. In FIG. 1 there is shown an assemblage which is operable to create a predetermined ΔP between the oxidant reactant flow field and the coolant water circulation loop. The oxidant reactant, which may be pure oxygen or ambient air, is pressurized at station 52, and thus flows through a line 54 into the cell oxidant reactant flow field 56 where it passes over the MEA 50. The station 52 may be a pressurized oxidant container when pure oxygen is utilized, or may be a compressor or blower when ambient air is used as the oxidant reactant. The pressurized oxidant gas also flows into a branch line 58 and thence into a reference vessel 60 which is divided by a separator 62 into two internal chambers 64 and 66. The separator 62 may take the form of a piston, a diaphragm, or the like. The chamber 64 will thus have a pressure which is equal to the oxidant reactant pressure and that pressure will be imposed on the separator 62, as indicated by arrows A.

The coolant water loop is indicated generally by the numeral 68. The coolant loop 68 includes a line 70 which carries the coolant water to and from the coolant flow field 72 in the active area of the power plant. The coolant water thus extracts heat from the active area of the power plant. The heated water flows through a heat exchanger 74 where its temperature is dropped to an appropriate level. A pump 76 causes the coolant water to move at an appropriate rate through the loop 68. A branch line 78 extends from the line 70 to the chamber 66 which thus fills with coolant water. The separator 62 is biased toward the chamber 64 by biasing devices, such as springs 80. The springs 80 are operable to counter the oxidant gas pressure to a predetermined degree, as indicated by arrow B. The counter pressure created by the springs 80 lowers the pressure exerted on the coolant water in the chamber 66, and thus in the entire loop 68, by a predetermined ΔP; thus the oxidant reactant pressure in the oxidant reactant flow field 56 will be a known increment (ΔP) greater that the pressure of the coolant water in the coolant water flow field 72. If necessary, pressure control valves 82 can also be incorporated into the coolant loop 68 to temporarily modify the system ΔP if necessary. While the preferred embodiment of the invention uses water as the coolant, so that the circulating water loop and the coolant loop are one and the same, in some applications it may be desirable to provide separate circulating water and circulating coolant loops. This would be the case where operating conditions of the power plant would dictate the use of a coolant such as ethylene glycol or the like.

The fuel reactant is supplied to the fuel reactant flow field 84 from a pressurized source 86 thereof via line 88. A pressure regulator 90 may be included in line 88 if necessary. The fuel gas and oxidant gas reactant flow fields 84 and 56 are formed in fine pore plates 94 and 92 respectively, which are able to wick and fill with water from the coolant flow field 72. A fine pore plate 94' is the fuel gas reactant flow field plate for the next adjacent cell, and the plate 94' combines with the plate 92 to form the coolant flow field 72. The combination of coolant water pressure and fine pore capillarity causes the plates 92, 94 and 94' to be filled with coolant water so that the active areas of the power plant will be adequately cooled and their temperature properly controlled. During operation of the power plant, the electrochemical reaction occurring at the MEA 50 causes pure water to be formed from hydrogen and oxygen ions at the surface of the MEA 50 facing the oxidant reactant flow field. This water which forms on the cathode side of the MEA is referred to as "product water" and it must be dealt with to avoid flooding of the cathode. The ΔP which exists between the flow fields 56 and 72 provides a positive pumping force which causes the product water to migrate through the fine pore plate 92 from the MEA 50 and into the coolant flow field 72 where it will be taken up in the circulating coolant Water stream. An exhaust line 98 extends from the chamber 66, or at some other location in the coolant loop, for periodically removing excess product water from the cooling loop 68. A valve 100 will be included in the line 98 when the system is pressurized. The valves 82 and 100 may be manually or automatically operated. It will be understood that the fine pore plates 94 will be operable to wick water to the surface of the MEA 50 which faces the fuel reactant flow field 84 on the anode side of the cell which tends to dry out during power plant operation. The water in the fine pore plates 94 and 94' thus prevents dryout of the anode side of each MEA 50. The pressure regulator 90 is operable to ensure that the pressure of the fuel gas reactant in the flow field 84 is sufficient to prevent flooding of the anode catalyst of the MEA, but does not exceed the bubble pressure of the fine pore plates 94 and 94'.

Once the proper operating ΔP between the oxidant flow field and the coolant water flow field is established, appropriate water management ensues automatically and is passively maintained without the need of complex valves and regulators. Any changes in the ΔP needed during certain operating conditions of the plant, such as changes in reactant utilization, plant power output, cell performance, temperature and pressure settings will be accomplished by adjustments to the valve 82. These ΔP changes can also be by adjustments to the coolant pump speed, or to the counter-pressure exerted on the separator 62. It will also be noted that the system unit shown utilizes saturated fine pore plates between adjacent cells to prevent reactant cross-over, however, properly located impermeable separator plates between adjacent cells could also be used.

Figure 2:
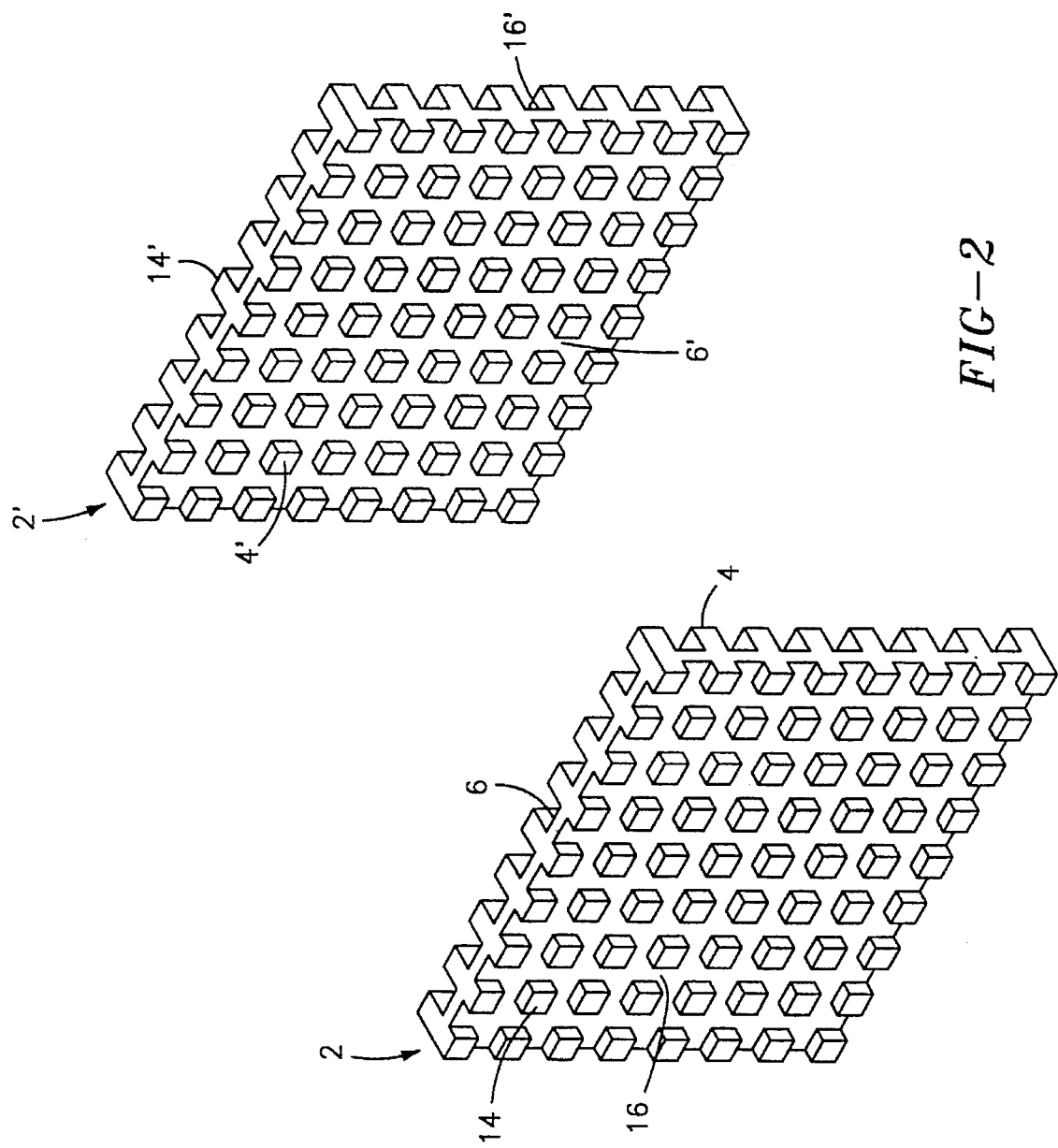
FIG. 2 is an exploded perspective view of two channeled conductor plates used to form reactant and coolant water flow passages in the power plant of this invention.

Referring now to FIG. 2, there is shown an example of a structural configuration of flow field plates which can be used to form the reactant and water circulating flow fields. Each plate 2 and 2' is preferably formed from a molded graphite powder which will provide fine pores on the order of about 1 to 2 microns median diameter. This degree of porosity will promote water migration from a first intercellular coolant water flow field to the anode side of the MEA and also away from the cathode side of the MEA and into the next adjacent coolant water flow field. The plates 2, 2' thus provide coolant water on demand to the anode side of the MEA to prevent the latter from drying out, to humidify incoming fuel and oxidant gases, and also to remove water from the cathode side of the MEA to prevent the cathode side from flooding. Each cell in the stack has its own dedicated water coolant flow field and is thus provided with the necessary amounts of water on demand as required by ongoing cell conditions, which may vary from cell to cell in the stack at any particular time, during operation of the stack. Opposite surfaces on the plate 2 are provided with a pattern of projections 4 and 14 which form a network of grooves 6 and 16 on opposite sides of the plate 2. The grooves 6 form a portion of the coolant water flow field in the stack, and the grooves 16 form the cathode reactant flow field for each cell in the stack. The plate 2' is also formed with projections 4' and 14', and a network of grooves 6' and 16' on its opposite surfaces. The grooves 6' form a portion of the water coolant flow field, and the grooves 16' form the anode reactant flow field for each cell in the stack.

Figure 3:
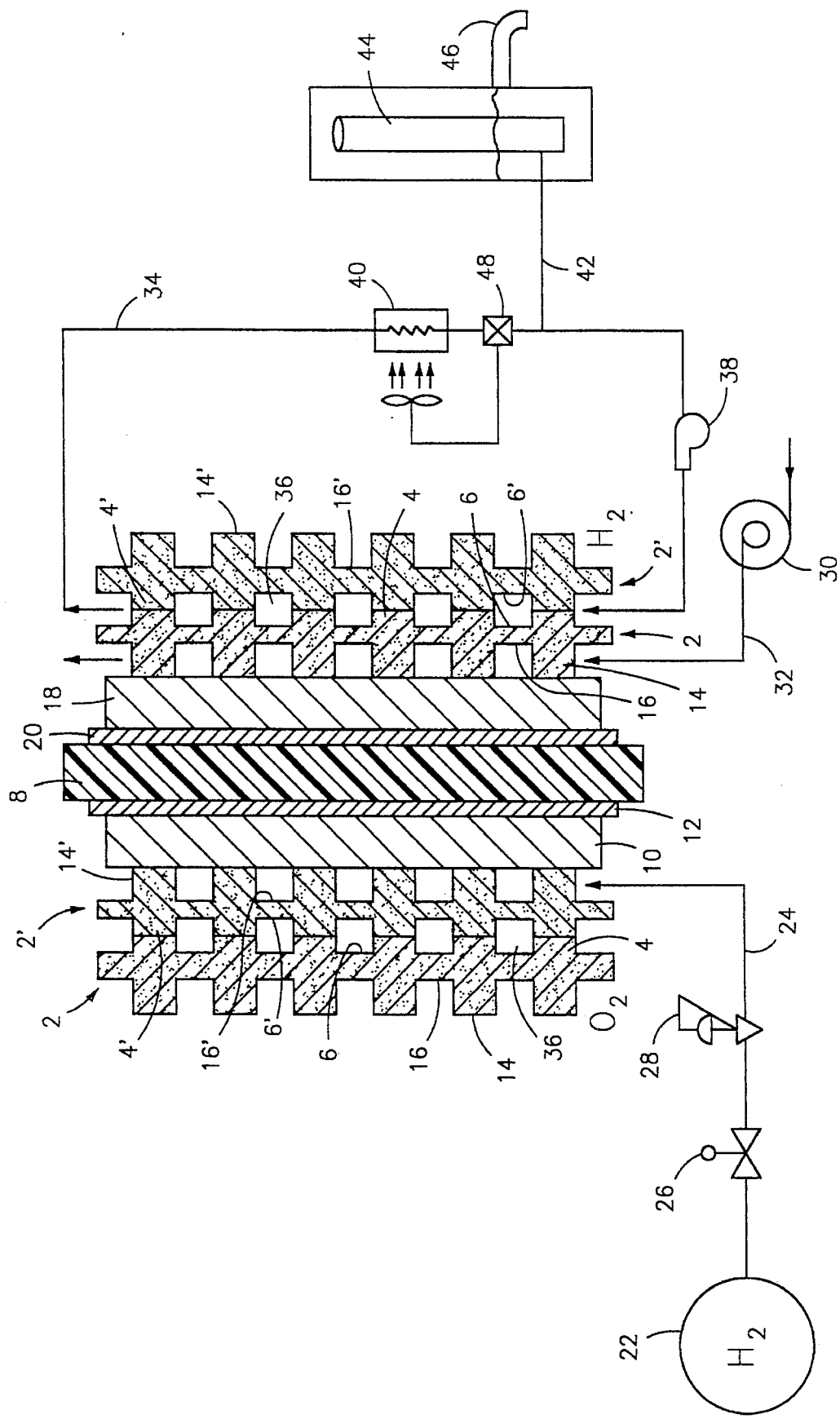
FIG. 3 is a schematic elevational view of one of the cells in an ambient pressure power plant which is formed in accordance with this invention.

Referring to FIG. 3, there is shown a cell unit or component of a power plant formed in accordance with this invention. Each cell component will include a membrane 8; an anode substrate 10, and an anode catalyst 12; a cathode substrate 18, and a cathode catalyst 20; an anode flow field plate 2'; and a cathode flow field plate 2. The flow field plates 2 and 2' are positioned back-to-back with the projections 4 and 4' being disposed in face-to-face contact. The grooves 6 and 6' combine to form coolant water flow fields on the anode and cathode sides of the electrolyte membrane 8. The projections 14' abut the anode substrate 10; and the projections 14 abut the cathode substrate 18. The grooves 16' thus form the anode reactant flow field; and the grooves 16 form the cathode reactant flow field.

FIG. 3 also shows, schematically, the System components of the fuel cell stack power plant. All of the anode reactant flow fields 16' in the power plant are supplied with a hydrogen gas reactant from a supply tank 22 thereof. The hydrogen reactant flows from the supply tank 22 to the anode flow fields 16' through a supply line 24. The amount and pressure of hydrogen flowing through the supply line 24 is controlled by a supply valve 26 and a supply regulator 28 which may be manually or automatically operated. The anode flow fields 16' are dead-ended inside of the power plant. All of the cathode flow fields 16 are supplied with ambient air via an air blower or compressor 30 and an air line 32. The oxygen used in the electrochemical reaction is thus derived from ambient air.

Coolant water is circulated through the power plant cell units via line 34. The coolant water passes through coolant passages 36 between the plates 2 and 2'. Circulation of the coolant water is promoted by a pump 38, which can be a fixed or variable speed pump. The coolant water circulating loop includes a heat exchanger 40 which lowers the temperature of the water exiting from the coolant passages 36. A branch line 42 leads from the line 34 to a stand pipe 44 that is open to ambient surroundings. The stand pipe 44 may include a drain spout 46 for releasing system water into the ambient surroundings. Excess water formed by the electrochemical reaction, i.e., product water, is bled into the stand pipe 44 by way of the line 42. Thus the stand pipe 44 provides a recipient of system product water, and also provides the necessary back pressure for establishing the system pressure in the water coolant loop.

The power plant operates as follows. Prior to start up, the coolant water loop 34, 36 and the stand pipe 44 are filled with coolant water. The level of the initial fill in the stand pipe may be just below the drain spigot 46. It will be understood, of course, that the drain spigot 46 may be omitted, and the stand pipe 44 can empty into the ambient surroundings through its upper open end. The water pump 38 is started so as to create a circulating flow of coolant water, and the reactants are then admitted into the anode and cathode sides of each of the cells in the power plant. A portion of the circulating coolant water will be drawn through the porous plates 2', into the projections 14' and against the anode side of the membrane 8. Any inert impurities found in the hydrogen fuel, such as helium, oxygen, carbon dioxide, and the like will diffuse through the membrane 8 since the hydrogen flow field 16' is dead-ended in the power plant. These impurities will then be flushed from the power plant by the air stream in the oxygen flow field 16, which air stream is vented to the ambient surroundings. Any water which migrates through the membrane 8 from the anode side, as well as product water which is formed on the cathode side of the membrane 8 by the electrochemical reaction, is drawn into the cathode plate projections 14, and passes through the plate 2 into the water coolant flow field 36. Some water will also be evaporated into the oxygen air stream and will vent from the system in the air stream exhaust. The excess product water which is formed in the electrochemical reaction will be pumped into the line 34 along with coolant water. All of the water in the coolant loop will be cooled in the heat exchanger 40, and excess product water in the loop will pass through the line 42 and enter the stand pipe 44, from whence it will periodically spill into the ambient surroundings. By providing a circulating coolant water supply for each cell in the power plant, each cell will have an "on-demand" supply of coolant water so that each cell will be able to operate at an optimum temperature, which is preferably between about 180° F. to somewhat less than 212° F., so that the coolant remains in its liquid state at near atmospheric operating pressures. Additionally, local water transport through the fine pore plates can add or remove water from reactant passages to maintain a fully saturated condition at all locations within the cells. With the constant supply of liquid water coolant, any cell which approaches the upper limit of the desired operating temperature range will receive sufficient water at its disposal to bring ;the cell operating temperature back down to the lower end of the desired operating temperature range. When the cells in the power plant are operating within the 180° F.–212° F. temperature range, a typical solid polymer electrolyte power plant with one hundred cells, each being one square foot in area and formed in accordance with this invention can produce a power output of about twenty two kilowatts, i.e. about 0.225 kilowatts per cell. In order to maintain the desired cell operating temperature range, and therefore the power output, the heat exchanger 40 will maintain the temperature of the water emitted therefrom in the range of about 1200° to about 150° F. To this end, the heat exchanger will preferably be controlled by a thermostat 48 which senses the temperature of the water stream exiting the heat exchanger 40.

It will be readily appreciated that the electrochemical power plant of this invention will provide an efficient conversion of hydrogen and oxygen to electricity using conventional components and operating at ambient or above ambient pressures, and at sufficiently low temperatures in most cases so that liquid water may be used as a coolant for the cells in the power plant: Each cell in the power plant has its own supply of water coolant which is available, on demand, responsive to individual ongoing cell operating conditions. The resulting relatively high operating temperature range enabled by a power plant constructed in accordance with this invention enables the construction of a relatively compact unit which can meet the power demands of storage batteries of the type used to operate vehicles, such as automobiles, buses, or the like. Larger fixed power plants can also be constructed. The referencing of the oxidant reactant gas pressure to the water coolant loop pressure provides a constant $\Delta P$ between the oxidant reactant flow fields and the water coolant flow field adjacent to each cell in the power plant, which $\Delta P$ causes water appearing at the cathode side of each cell in the power plant to be pumped through the fine pore flow field plates into the water coolant stream. The management of water in the power plant is thus achieved passively and without the need of complex valve and regulator networks, and without the need of condensers and evaporators. The passive nature of the water management system formed in accordance with this invention allows the construction of larger and higher current density solid polymer electrolyte power plants since each cell in the power plant is serviced individually, and there is no need to remove water by means of a moving gas stream that travels from one end of the power plant to the other, past each cell, as with the prior art systems.

Since many changes and variations of the disclosed embodiment of the invention may be made without departing from the inventive concept, it is not intended to limit the invention otherwise than as required by the appended claims.

What is claimed is:

1. A method for operating a solid polymer electrolyte fuel cell power plant having a membrane/electrode assembly (MEA)i said method comprising the steps of:
    a) providing oxidant and fuel reactant gas streams on opposite cathode and anode sides of the MEA;
    b) providing a circulating water stream on said cathode side of the MEA;
    c) providing a fine pore plate between said oxidant gas stream and said circulating water stream;
    d) pressurizing said oxidant reactant gas stream to a first pressure;
    e) imposing said first pressure from said oxidant reactant gas stream on said water stream; and
    f) partially counteracting said first pressure imposed on said water stream so as to create a positive target pressure differential ($\Delta P$) between said oxidant reactant gas stream and said water stream, which $\Delta P$ is operative to pump product water formed on the cathode side of the MEA through said fine pore plate and into said circulating water stream.

2. The method of claim 1 wherein said oxidant reactant gas stream is pressurized to a pressure which is above ambient pressure.

3. The method of claim 1 further comprising the step of periodically releasing product water from said water stream.

4. The method of claim 1 further comprising the step of providing a pressure regulating vessel which is divided by a pressure-transferring separator into respective oxidant gas stream and water stream chambers; and utilizing said separator to transfer the oxidant gas stream pressure from said oxidant gas stream chamber to water in said water stream chamber.

5. The method of claim 4 comprising the further step of applying a counteracting pressure to said separator from said water stream chamber so as to produce said $\Delta P$.

6. The method of claim 1 wherein said water stream is also a coolant stream for an MEA.

7. A method for operating a solid polymer electrolyte fuel cell power plant having a membrane/electrode assembly (MEA) at essentially ambient pressure, said method comprising the steps of:

a) providing ambient air oxidant reactant and fuel gas reactant streams on respective opposite cathode and anode sides of the MEA;

b) providing a circulating water stream on said cathode side of the MEA;

c) providing a fine pore plate between said oxidant gas stream and said circulating water stream;

d) providing an ambient surroundings-referenced pressure in said water stream by exposing a portion of said water stream to ambient surroundings; and e) pressurizing said ambient air reactant stream to a first pressure which is above ambient pressure so as to create a positive pressure ($\Delta P$) differential between said ambient air reactant stream and said water stream, which $\Delta P$ is operative to pump product water formed on the cathode side of the MEA through said fine pore plate and into said circulating water stream.

8. The method of claim 7 wherein said ambient air reactant stream pressurizing step is performed with an air compressor or an air blower.

9. The method of claim 7 comprising the further step of periodically removing product water from said water stream.

10. The method of claim 9 further comprising the step of providing a coolant water stand pipe operable to receive and reference the water stream to extant ambient surroundings pressure.

11. The method of claim 10 wherein said product water-removing step is performed by releasing product water into ambient surroundings through said stand pipe.

12. The method of claim 7 wherein said water stream is a water coolant stream.

13. A solid polymer electrolyte fuel cell power plant having a membrane/electrode assembly (MEA), said power plant comprising:

a) oxidant and fuel reactant gas streams on opposite cathode and anode sides of the MEA;

b) a circulating water stream on said cathode side of the MEA;

c) a fine pore plate between said oxidant gas stream and said circulating water stream;

d) means for pressurizing said oxidant reactant gas stream to a first pressure;

e) means for imposing said first pressure from said oxidant reactant gas stream on said water stream; and f) means for partially counteracting said first pressure imposed on said water stream so as to create a positive target pressure differential ($\Delta P$) between said oxidant reactant gas stream and said water stream, which $\Delta P$ is operative to pump product water formed on the cathode side of the MEA through said fine pore plate and into said circulating water stream.

14. The assembly of claim 13 comprising means for pressurizing said oxidant reactant gas stream to a pressure which is above ambient pressure.

15. The assembly of claim 13 further comprising means for periodically releasing product water from said water stream.

16. The assembly of claim 13 further comprising a pressure regulating vessel which is divided by a pressure-transferring separator into respective oxidant gas stream and water stream chambers and which utilizes said separator to transfer the oxidant gas stream pressure from said oxidant gas stream chamber to water in said water stream chamber.

17. The assembly of claim 16 comprising means for applying a counteracting pressure to said separator from said water stream chamber so as to produce said $\Delta P$.

18. The assembly of claim 13 wherein said water stream is also a coolant stream for the MEA.

19. A solid polymer electrolyte fuel cell power plant having a membrane/electrode assembly (MEA), said power plant comprising:

a) ambient air oxidant reactant and fuel gas reactant flow fields on respective opposite cathode and anode sides of the MEA;

b) a circulating water stream flow field On said cathode side of the MEA;

c) a fine pore plate interposed between said oxidant reactant flow field and said circulating water stream flow field;

d) means for providing an ambient surroundings-referenced pressure in said water stream flow field by exposing a portion of said water stream flow field to ambient surroundings; and e) means for pressurizing said ambient air reactant flow field to a first pressure which is above ambient pressure so as to create a positive pressure ($\Delta P$) differential between said ambient air reactant flow field and said water stream flow field, which $\Delta P$ is operative to pump product water formed on the cathode side of the MEA through said fine pore plate and into said circulating water stream flow field.

20. The assembly of claim 19 wherein said means for pressurizing is an air compressor or an air blower.

21. The assembly of claim 19 further comprising means for periodically removing product water from said water stream flow field.

22. The assembly of claim 21 further comprising a water stand pipe open to ambient surroundings and operable to reference the water stream flow field to extant ambient pressure.

23. The assembly of claim 22 wherein said means for removing product water is in the stand pipe.

24. The assembly of claim 19 wherein said water stream flow field is also a coolant stream flow field.

* * * * *

UNITED STATES PATENT AND TRADEMARK OFFICE
CERTIFICATE OF CORRECTION

PATENT NO. : 5,503,944
DATED : April 2, 1996
INVENTOR(S) : Alfred P. Meyer, et al.

It is certified that error appears in the above-identified patent and that said Letters Patent is hereby corrected as shown below:

In column 7, line 54, delete "1200°" and insert --120°--.

Signed and Sealed this

Twentieth Day of August, 1996

Attest:

BRUCE LEHMAN

Attesting Officer   Commissioner of Patents and Trademarks